(12) United States Patent
Wheelock

(10) Patent No.: US 9,088,390 B1
(45) Date of Patent: Jul. 21, 2015

(54) RE-SYNCHRONIZATION OF TIMING BETWEEN COMMUNICATION DEVICES

(71) Applicant: ARRIS Group, Inc., Suwanee, GA (US)

(72) Inventor: Ian Wheelock, Cork (IE)

(73) Assignee: ARRIS Enterprises, Inc., Suwanee, GA (US)

(*) Notice: Subject to any disclaimer, the term of this patent is extended or adjusted under 35 U.S.C. 154(b) by 0 days.

(21) Appl. No.: 13/833,450

(22) Filed: Mar. 15, 2013

(51) Int. Cl.
*H04J 7/00* (2006.01)
*H04L 7/00* (2006.01)

(52) U.S. Cl.
CPC .................... *H04L 7/0016* (2013.01)

(58) Field of Classification Search
USPC .......................... 375/371, 354, 356
See application file for complete search history.

(56) References Cited

U.S. PATENT DOCUMENTS

| 7,023,816 B2* | 4/2006 | Couillard .................. 370/324 |
| 2012/0300859 A1* | 11/2012 | Chapman et al. ........... 375/257 |

* cited by examiner

*Primary Examiner* — Eva Puente
(74) *Attorney, Agent, or Firm* — Troy A. Van Aacken

(57) ABSTRACT

Systems and methods of this disclosure can operate to re-synchronize timing between communication devices and can include a timing server. The timing server can provide timing messages containing timing correction values to communication devices that can synchronize the communication devices. If communication devices fail to receive timing messages, the communication devices may continue to provide communication services using their internal clocks that can drift over time. When timing messages are restored, the timing correction values can be significant enough to result in the loss of communications if immediately applied by communication devices. By gradually applying timing corrections over a period of time approaching the received timing correction value, communication devices can achieve re-synchronization while avoiding and/or minimizing the loss of communications.

18 Claims, 3 Drawing Sheets

RE-SYNCHRONIZATION OF TIMING BETWEEN COMMUNICATION DEVICES

TECHNICAL FIELD

This disclosure relates to systems and methods for the re-synchronization of timing between communication devices where a timing server is used.

BACKGROUND

The Data-Over-Cable Service Interface Specification (DOCSIS) was established by cable television network operators to facilitate transporting data packets, primarily internet packets, over existing community antenna television (CATV) networks. Cable television network operators also use their CATV network infrastructure for carrying voice, video on demand (VoD) and video conferencing packet signals, among other types.

Broadband services can be delivered via existing cable infrastructure from MSOs, digital subscriber lines (xDSL), integrated service digital network (ISDN), public switched phone networks, or T1 connections from telecommunications operators or internet service providers, satellite from satellite operators, or wireless services (such as, e.g., cellular, 802.11 or Wi-MAX standards, etc.) from wireless service providers, among many others. In some DOCSIS implementations, a modular cable modem termination (M-CMTS) architecture can be comprised of components such as, for example, an M-CMTS core, Edge-QAM (EQAM) and DOCSIS Timing Interface (DTI) server. The M-CMTS architecture can provide operators with increased efficiency and availability of network resources.

An element of the communication system architecture is the separation of downstream physical layer QAM modulation functions from a traditional CMTS to EQAMs and upstream receivers. The separation allows the EQAM to support both video and DOCSIS standards thereby enabling operators to use the same network resources to support multiple types of services such as, for example, data, voice and video.

The interface supporting the separation of a broadband communication system (e.g., M-CMTS core) and modulator systems (e.g., EQAM(s)) is defined by the DOCSIS standards as a Downstream External PHY Interface (DEPI), which provides for transport of downstream data between M-CMTS core and EQAM(s). A component of the DEPI interface is a DTI server, defined by the DOCSIS Timing Interface Specification (DTI) which can provide the exchange of timing messages between a DTI server and DTI clients (e.g., M-CMTS core and EQAM(s)) to synchronize timing between the communication devices.

DETAILED DESCRIPTION

In some implementations of this disclosure, systems and methods can operate to provide timing re-synchronization between a timing server and communication devices that include a timing client.

The DOCSIS DTI specification defines a protocol for timing messages between a timing server (e.g., DOCSIS DTI server) and timing clients (e.g., DOCSIS DTI clients.) Communication devices such as M-CMTS(s), EQAM(s) can include timing clients. The timing server can communicate with timing clients of communication devices to ensure a master clock and time stamp information can be synchronized between the communication devices. In some implementations, two-way communication between the timing server and timing clients can allow the timing server to determine the propagation delay to each communication device and generate timing messages providing timing correction values that can include a time offset to maintain synchronization of the master clocks and time stamps between the communication devices.

In the event timing clients are unable to receive messages from a timing server they may continue to function using their own internal clocks in a "free running" mode. The internal clocks of the timing clients can drift over time. As the elapsed time increases between the loss and restoration of timing server messages, the drift of internal clocks within the timing client also increases accordingly. When the communication between the timing server and timing client(s) is restored, the timing correction values supplied by the timing server can result in the temporary loss of communications with customer premise equipment (CPE) devices if the communication devices apply the timing correction values. In some implementations, communication devices can minimize and/or prevent the loss of communication through gradually adjusting their internal timing over a time period to approach the timing correction values supplied by the timing server.

Figure 1:
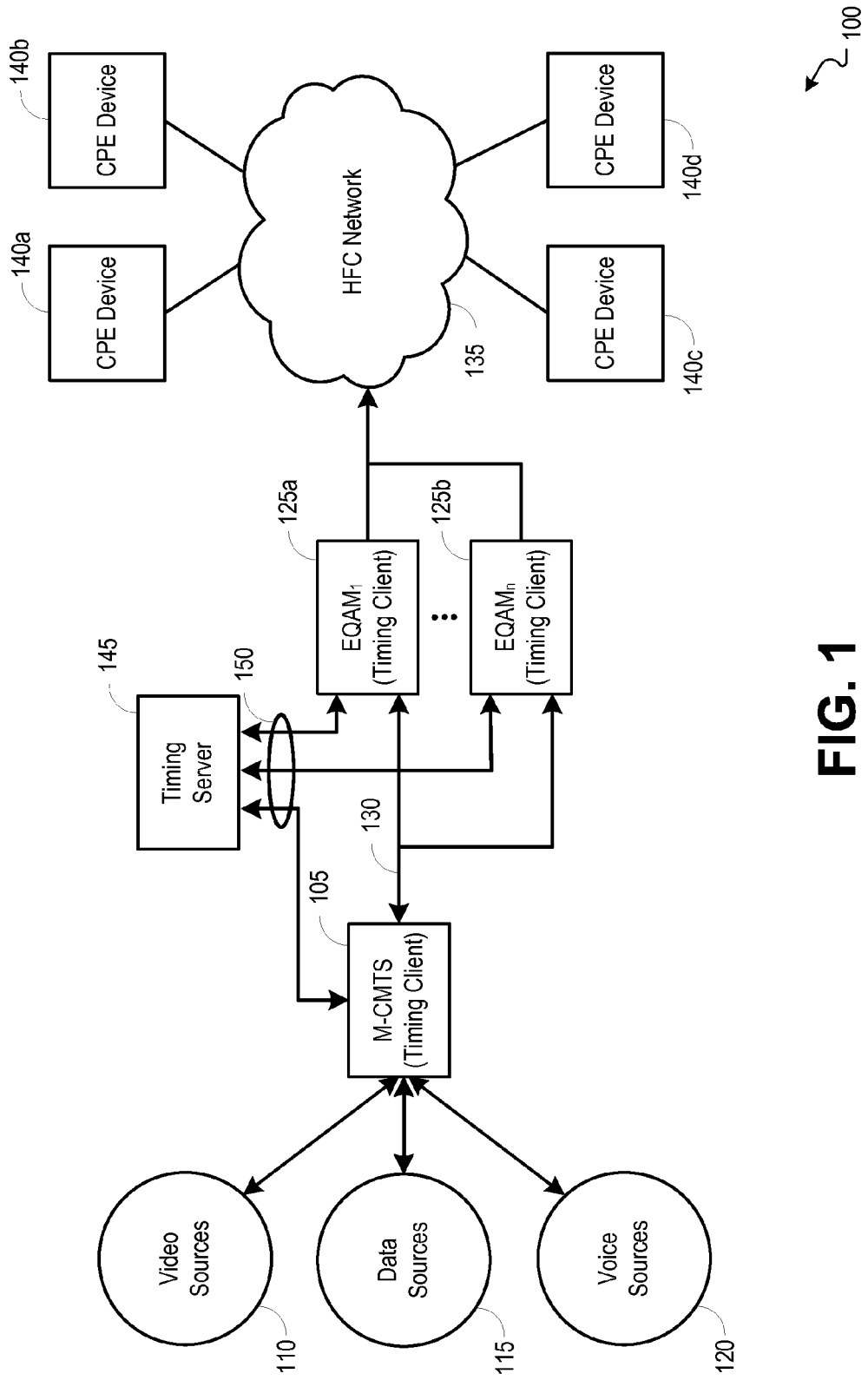
FIG. 1 is a block diagram illustrating an example network environment operable to provide a M-CMTS architecture with a timing server.

FIG. 1 is a block diagram illustrating an example network environment operable to provide an M-CMTS architecture with a timing server. In some implementations, the M-CMTS 105 core can transmit and/or receive information from/to video, data and video sources 110, 115 and 120 respectively. The M-CMTS core 105 can send video, data, and/or voice information to EQAM(s) 125a-b though communication path(s) 130. In other implementations, the EQAM(s) can receive video from video sources 110 directly (not shown). EQAM(s) 125a-b can then transmit downstream video, data and voice through the hybrid fiber coax (HFC) network 135 to end users at a customer premise device(s) 140a-d. CPE device(s) 140a-b can be cable modems (CMs), enhanced multimedia terminal adapters (eMTAs), gateway devices (GW) and/or set top boxes.

To provide reliable communication on HFC network 135 the master clocks and time stamps can be synchronized between the M-CMTS core 105 and EQAM(s) 125a-b. In some implementations, a timing server 145 can provide timely and accurate communication with the timing clients of communication devices (e.g., M-CMTS core 105, EQAM(s) 125a-b) by providing timing correction values, thereby synchronizing the communication devices.

In some implementations, timing server 145 can initiate communication with the timing clients of the M-CMTS 105 and/or EQAM(s) 125a-b through communications path(s) 150 based on a master clock. The timing clients of the M-CMTS 105 and/or EQAM(s) 125a-b can reply with a value that can represent the phase error between their internal clocks and the timing server 145 master clock. The timing server 145 can use the time difference between sending and receiving timing messages to/from the timing clients of the M-CMTS 105 and/or EQAM(s) 125a-b to determine and compensate for any delays between the timing server 145 and the timing clients of the M-CMTS 105 and/or EQAM(s) 125a-b. The timing server 145 can send timing messages including timing correction values to the timing clients of the M-CMTS 105 and/or EQAM(s) 125*a-b* that can include time stamp and clock adjustment values based on the time difference.

In other implementations, timing clients of the M-CMTS 105 and/or EQAM(s) 125*a-b* can "snoop" the timing messages between the timing server 145 and another timing client to adjust their master clocks and time stamps as if they were the other timing client as disclosed in U.S. patent application Ser. No. 13/832,756, entitled "M-CMTS, Edge-QAM and Upstream Receiver Core Timing Synchronization," filed Mar. 15, 2013, which is incorporated herein by reference in its entirety. Communication between the timing server 145 and timing clients of the M-CMTS 105 and/or EQAM(s) 125*a-b* can occur continually.

The M-CTMS 105 can use an internal clock synchronized with the timing servers 145 master clock to generate messages that can include time stamps. The time stamp values can be used by the M-CMTS 105 to generate downstream messages (e.g., DOCSIS MAP) for allocating upstream transmission opportunities for CPE device(s) 140*a-*140*d*. The EQAM (s) 125*a-b* can use an internal clock synchronized with the timing servers 145 master clock for symbol rate generation. The time stamp value can be used by the EQAM(s) 125*a-b* to create messages (e.g., DOCSIS SYNC) to CPE device(s) 140*a-d* to maintain synchronization for upstream transmission opportunities.

Ranging operations can occur between the M-CMTS 105 and CPE device(s) 140*a-d*. CPE device(s) 140*a-d* can use their internal clocks to create a time base to determine the time to transmit information corresponding to a time or times specified in a downstream message (e.g., DOCSIS MAP). The physical distances between the CPE device(s) 140*a-d* and the M-CMTS 105 can be different resulting in different propagation delays that, if not accounted for, can result in upstream transmission collisions between the CPE device(s) 140*a-d*. Ranging operations can occur periodically through ranging messages between the M-CMTS 105 and CPE device (s) 140*a-d* and can result in the CPE device(s) 140*a-d* being supplied with a time offset by the M-CMTS 105 accounting for the propagation delays or change in propagation delays. CPE device(s) 140*a-d* can periodically receive downstream time stamp messages (e.g., DOCSIS SYNC) from an EQAM (s) 125*a-b* to update their time base. CPE device(s) 140*a-d* can initiate ranging if the difference between their time base and a received time stamp reaches a threshold value. During ranging operations by CPE device(s) 140*a-d* communication services to end users can be interrupted.

Communication between the timing server 145 and timing clients of M-CMTS 105 and/or EQAM(s) 125*a-b* can fail. In some implementations, under such circumstances the timing clients of the M-CMTS 105 and/or EQAM(s) 125*a-b* can continue to provide communication services using a "free running" local time source. The "free running" local time source can drift over time. Restoration of communication between the timing server 145 and the timing clients of the M-CMTS 105 and/or EQAM(s) 125*a-b* can result in the loss of end user communication (e.g., CPE device(s) 140*a-d* initiating ranging operations) if the M-CMTS 105 and/or EQAM(s) 125*a-b* apply the timing correction value received from the timing server 145 where the absolute difference between the timing correction value and the local time source in the timing clients of the M-CMTS 105 and/or EQAM(s) 125*a-b* is significant.

In some implementations, the absolute difference between the reinstated timing correction value and the local time source in the timing clients of the M-CMTS 105 and/or EQAM(s) 125*a-b* can be compared to a threshold value. If the threshold value is exceeded the timing clients of the M-CMTS 105 and/or EQAM(s) 125*a-b* can gradually apply local timing corrections to their local time sources where the local timing corrections approaches the timing corrections received from the timing server 145 over time. The value of the local timing corrections and/or threshold value can be configurable.

The timing client of a communications device can be used for the redistribution of timing information within a communication device to modules within the communication device. In some implementations, the timing client can provide functionality of a timing server within the communications device and communicate with modules comprising timing clients.

Figure 2:
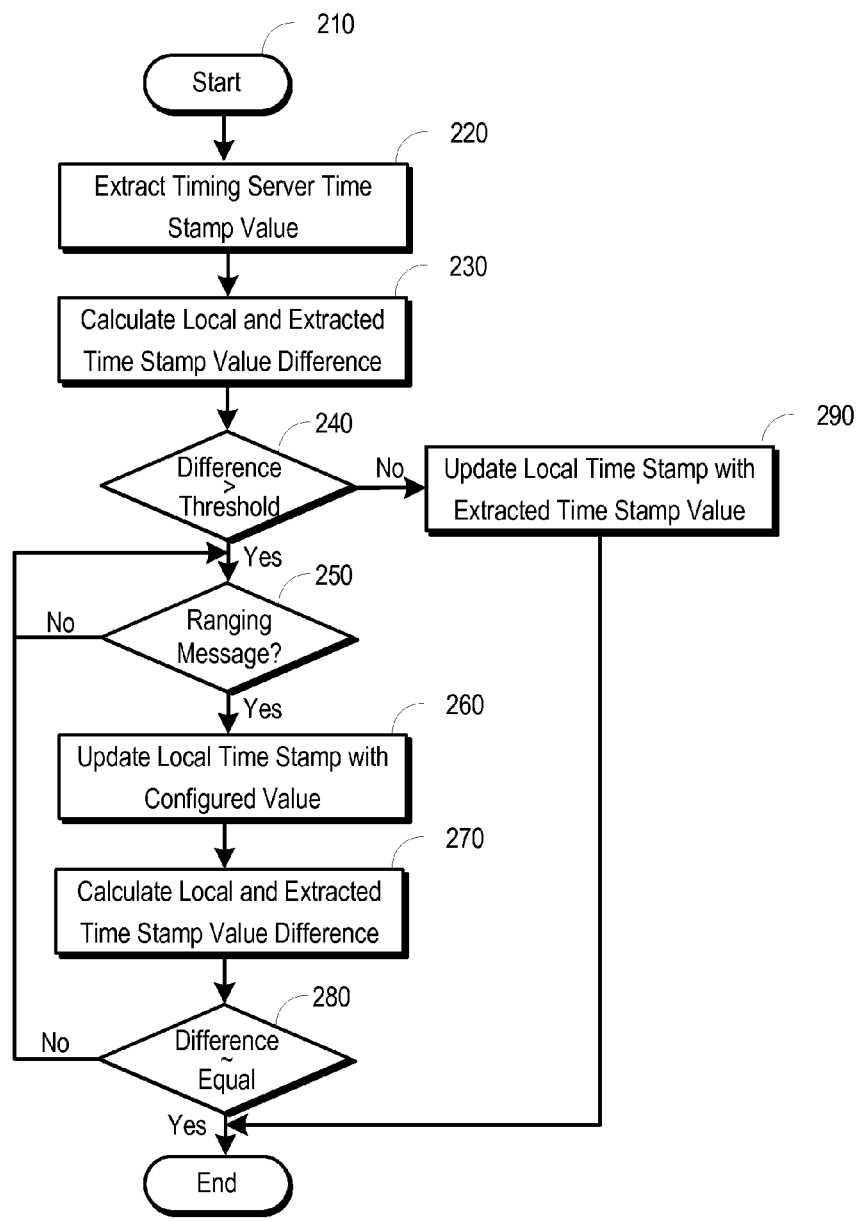
FIG. 2 is a flow chart illustrating an example process that can be used by a timing client of a communications device for re-synchronizing with a timing server.

FIG. 2 is a flow chart illustrating an example process 200 that can be used by a timing client of a communications device for re-synchronizing with a timing server. The process 200 starts at stage 210 after the restoration of communications with a timing server.

At stage 220, a time stamp value is extracted from a timing message received from a timing server (e.g., timing server 145 of FIG. 1). The time stamp value can be extracted, for example, by the timing client of a communications device (e.g., M-CMTS 105 and EQAM(s) 125*a-b* of FIG. 1).

At stage 230, the absolute difference between the extracted time stamp and the local time stamp of the timing client can be calculated. The absolute difference can be calculated, for example, by the timing client.

At stage 240, a determination can be made if the absolute difference between the extracted time stamp and the local time stamp is greater than a threshold value. If the absolute difference is greater than the threshold value, process 200 proceeds to stage 250. If the absolute difference is less than the threshold value, process 200 proceeds to stage 290. In some implementations, the threshold value can be configurable. The determination can be made, for example, by the timing client.

At stage 250, a determination can be made if a ranging message had been received. If a ranging message has been received, process 200 proceeds to stage 260. If a ranging message is not received, process 200 remains in stage 250. While in stage 230, if the timing client receives a timing message from the timing server, process 200 can proceeds to stage 220 (not shown). The determination can be made, for example, by the timing client.

At stage 260, the local time stamp is updated with a value. In some implementation the value can be configurable. The local time stamp can be updated with a value, for example by the timing client.

At stage 270, the difference between the current value of the local time stamp and the extracted time stamp can be calculated. The difference, for example, can be calculated by the timing client.

At stage 280, the determination can be made if the local time stamp value has approached the extracted time stamp value. If the local time stamp value has approached the extracted time stamp value to within a convergence threshold, process 200 completes. If the local time stamp value has not approached the extracted time stamp value within a convergence threshold, process 200 returns to stage 250. The determination can be made, for example, by the timing client.

At stage 290, the local time stamp is updated with the extracted time stamp value and process 200 completes. The local time stamp can be updated, for example by the timing client.

Figure 3:
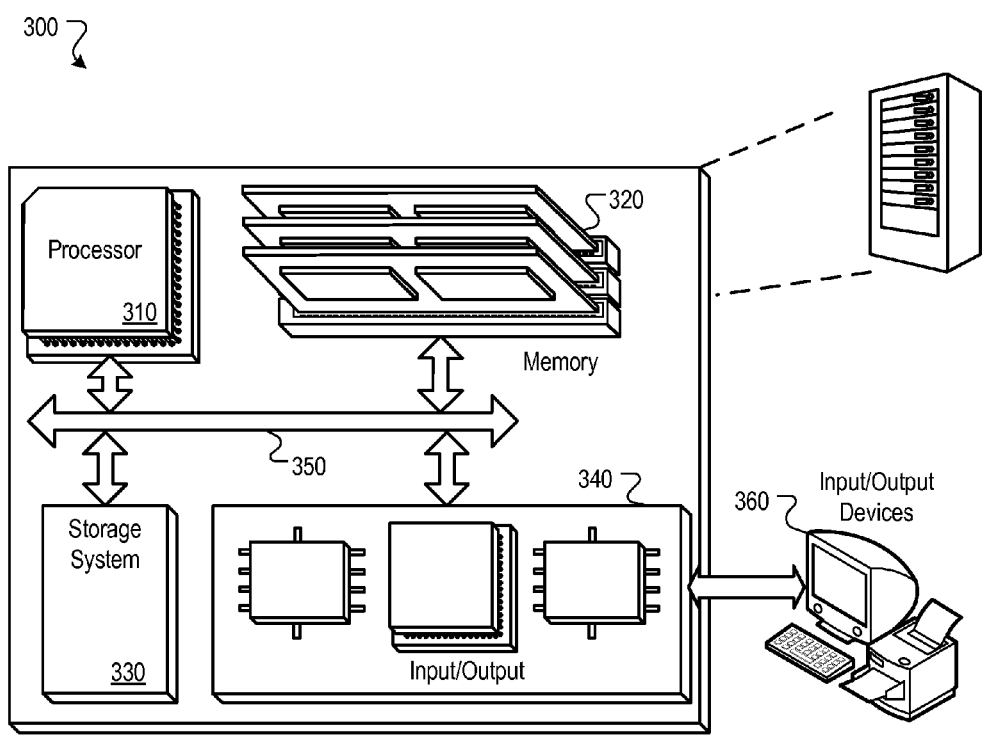
FIG. 3 is a block diagram of a timing client operable to provide timing re-synchronization with a timing server.

FIG. 3 is a block diagram of a timing client operable to provide timing re-synchronization with a timing server. The timing client 300 can include a processor 310, a memory 320, a storage device 330, and an input/output device 340. Each of the components 310, 320, 330, and 340 can, for example, be interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the device 700. In one implementation, the memory 320 is a computer-readable medium. In one implementation, the memory 320 is a volatile memory unit. In another implementation, the memory 320 is a non-volatile memory unit.

In some implementations, the storage device 330 is capable of providing mass storage for the device 300. In one implementation, the storage device 330 is a computer-readable medium. In various different implementations, the storage device 330 can, for example, include a hard disk device, an optical disk device, flash memory or some other large capacity storage device.

The input/output device 340 provides input/output operations for the device 300. In one implementation, the input/output device 340 can include one or more of a wireless interfaces. In addition, such input/output device 340 can communicate with other external devices through interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The device (e.g., a timing client device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMA-Script instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A system, comprising:
   a data-over-cable-service interface specification (DOCSIS) timing interface (DTI) server operable to generate one or more messages comprising a timing correction value;
   a plurality of communication devices each comprising a timing client coupled to the DTI server, the plurality of communication devices comprising at least a cable modem termination system and at least one edge quadrature amplitude modulator (EQAM);
   the plurality of communication device timing clients being operable to receive the one or more messages comprising a timing correction value from the DTI server;
   the timing client comprising a local time source, wherein the timing client is further operable to determine a time difference between the local time source and the timing correction value; and
   the timing client further operable to update the local time source, wherein the local time source is updated iteratively by no more than a first value over time to approach the timing correction value if the time difference meets a threshold of a second value.

2. The system of claim 1, wherein the DTI server comprises a component of a modular cable modem termination system (M-CMTS).

3. The system of claim 1, wherein one or more of the communication devices comprises components of one or more modular cable modem termination systems (M-CMTSs).

4. The system of claim 1, wherein the timing correction value comprises a time stamp.

5. The system of claim 4, wherein the local time source is updated over time coinciding with ranging operations.

6. The system of claim 1, wherein updating the local time source by the first value over time does not disrupt end user communications.

7. The system of claim 6, wherein end user communications are not disrupted through ranging operations initiated by one or more customer premise equipment devices.

8. The system of claim 1, wherein the first value is configurable.

9. The system of claim 1, wherein the second value is configurable.

10. The system of claim 1, wherein the one or more timing clients receive the timing correction value by snooping timing messages intended for another timing client.

11. The system of claim 1, wherein the timing client is further operable to perform timing server functions to one or more modules in the plurality of communication devices comprising timing clients for the redistribution of timing information.

12. A computer-implemented method, comprising:
   extracting a time stamp value from a timing message received from a data over cable service interface specification (DOCSIS) timing interface (DTI) server at a plurality of timing clients comprising at least one cable modem termination system and at least one quadrature amplitude modulator;
   calculating an absolute difference between the time stamp value and a local time stamp received at the plurality of timing clients; and
   updating the local time stamp iteratively at each of the plurality of timing clients by no more than a first value upon receiving a ranging message to approach the time stamp value if the absolute difference between the time stamp value and local time stamp meets a threshold defined by a second value.

13. The method of claim 12, wherein the method is practiced by an edge-quadrature amplitude modulator (EQAM) component.

14. The method of claim 12, wherein the method is performed following the restoration of communication with a timing server.

15. A computer-implemented method, comprising:
   extracting a timing correction value from a timing message;
   calculating an absolute difference between the timing correction value and a local time source; and
   updating the local time source at each of a plurality of cable modem termination systems and quadrature amplitude modulators iteratively by no more than a configurable first value over time to approach the timing correction value if the absolute difference between the timing correction value and a respective local time source meets a threshold defined by a second value.

16. The computer-implemented method of claim 15, wherein the method is practiced by one or more modules of a communications device.

17. The computer-implemented method of claim 15, wherein the local time source is updated over time after receipt of a ranging message.

18. The computer-implemented method of claim 15, wherein the timing correction value is extracted through snooping the timing message of another of the plurality of cable modem termination systems or quadrature amplitude modulators.

* * * * *